United States Patent
Tsien et al.

[11] Patent Number: 5,527,887
[45] Date of Patent: Jun. 18, 1996

[54] DISAZO ACID DYESTUFFS FOR POLYAMIDE FIBERS APPLICABLE IN NEUTRAL SOLUTION

[75] Inventors: Hsien-Chyang Tsien; Chen-Kung Chi; Hung Chang, all of Taipei, Taiwan

[73] Assignee: Allied Industrial Corp., Ltd., Taipei, Taiwan

[21] Appl. No.: 371,980

[22] Filed: Jan. 12, 1995

[51] Int. Cl.$^6$ ............................ C09B 31/153; D06P 3/06
[52] U.S. Cl. ............................ 534/763; 8/531; 8/681; 8/917; 8/924
[58] Field of Search ............................ 534/763; 8/531, 8/681, 917, 924

[56] References Cited

U.S. PATENT DOCUMENTS

| | | |
|---|---|---|
| 3,979,378 | 9/1976 | Gnad et al. ............ 534/763 X |
| 4,668,774 | 5/1987 | Loeffler et al. ............ 534/763 X |

FOREIGN PATENT DOCUMENTS

| | | | |
|---|---|---|---|
| 1275730 | 5/1972 | United Kingdom ............ 534/763 |

Primary Examiner—Fiona T. Powers
Attorney, Agent, or Firm—Bacon & Thomas

[57] ABSTRACT

Disazo acid dyestuff with the following general formula:

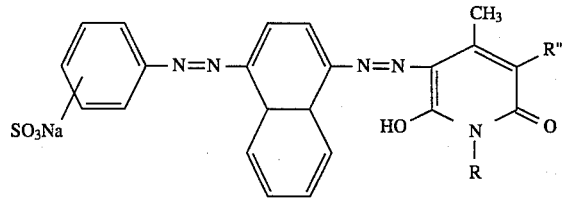

wherein R represents H, $C_nH_{2n+1}$ wherein n is a natural number between 1 and 4, or $(CH_2)_mOR'$ wherein m is a natural number between 1 and 4 and R' represents $C_pH_{2p+1}$ wherein p is an integral number between 0 and 4; wherein R" represents H, CN or COOR wherein R has the same definition as above. The sulfo group may be at any position of the benzene ring.

6 Claims, No Drawings

DISAZO ACID DYESTUFFS FOR POLYAMIDE FIBERS APPLICABLE IN NEUTRAL SOLUTION

FIELD OF THE INVENTION

The present invention relates to new disazo acid dyestuffs comprising new disazo compositions. The disazo composition of the present invention is applicable for use in neutral dyeing for the coloration of polyamide fabrics, wool and silk to give the dyeing in rubine shade with excellent fastness to light and washing.

BACKGROUND OF THE INVENTION

Dyestuffs are widely used in the textile industry. Materials to which dyestuffs are to be applied, include polyamide fabrics, wool and silk. Dyestuffs for polyamide fabrics that are applicable in neutral conditions, are highly desireable to the industry.

PRIOR ART

Acid dyestuffs comprised of disazo are found useful in the application of the dyeing of nylon fabrics. C. I. Acid Blue 113 (see the following formula VI) and C. I. Acid Orange 116 (see the following formula VII) with disazo structure are good examples. However, Acid Blue 113 does not dye polyamide fabric in neutral dyeing solution. Acid Orange 116 requires an additional step of ethylation in its manufacturing after the final coupling reaction.

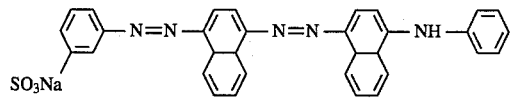

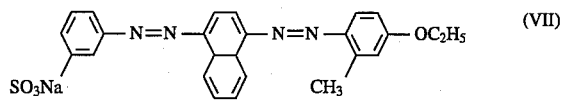

It is thus in great demand in the industry to provide dyestuff that is suited for the dyeing of polyamide fabrics, wool and silk.

It is particularly a need in the industry to have an acid dye that is applicable in neutral solution.

OBJECT OF THE INVENTION

It is thus an object of this invention to provide a new disazo compound.

A further object of this invention is to provide dyestuff suited for polyamide fabrics with good fastness properties.

An other object of this invention is to provide dyestuff applicable in neutral solution.

An other object of this invention is to provide a new method for preparing the disazo compound of this invention.

BRIEF DESCRIPTION OF THE INVENTION

According to the embodiments of this invention, new disazo compounds with Formula I are prepared:

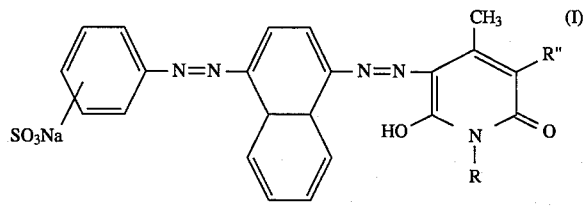

wherein R represents H, $C_nH_{2n+1}$ wherein n is a natural number between 1 and 4, or $(CH_2)_mOR'$ wherein m is a natural number between 1 and 4 and R' represents $C_pH_{2p+1}$ wherein p is an integral number between 0 and 4; wherein R" represents H, CN or COOR wherein R has the same definition as above. The sulfo group may be at any position of the benzene ring.

The preparation of compounds of Formula I, of this invention includes: the diazotization of metanilic, sulfanilic or orthanilic acid with HCl and $NaNo_2$ and the coupling of the resulted diazonium salt to alphanaphthylamine to give the respective intermediate (III).

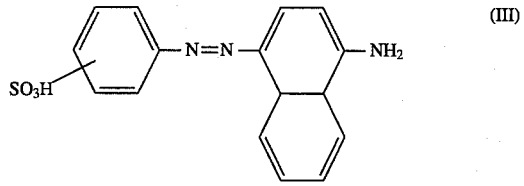

Rediazotization of the compound of Formula III with HCl and $NaNO_2$ and coupling the diazonium salt so obtained to 1-R- 3-R"-4-methyl-6-hydroxy-2-pyridone (R and R" have the same definition as in Formula I) are applied to give compound (I).

The above and other objects and advantages of this invention will be more clearly understood by referring to the following description.

DETAILED DESCRIPTION OF THE INVENTION

According to the present invention, disazo compounds with Formula I may be prepared through the following steps.

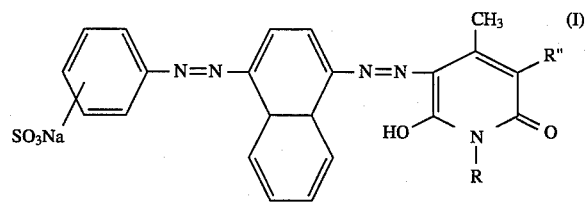

1. Diazotization of aminobenzenesulfonic acid.

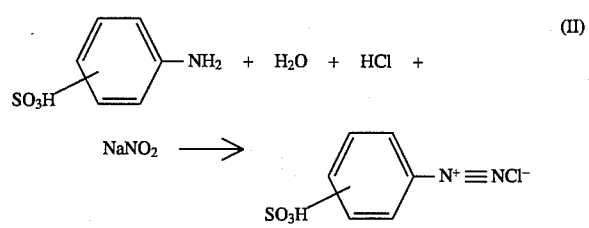

2. Coupling of the compound so obtained with 1-naphthylamine.

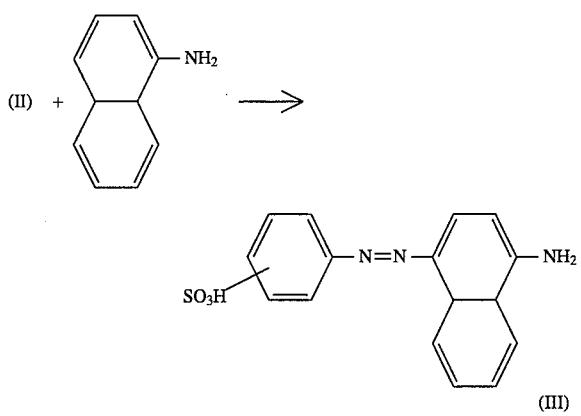

3. Second diazotization of compound (II) yielded (III).

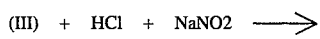

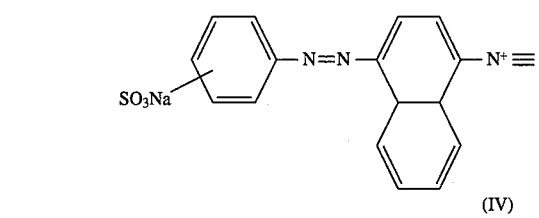

4. Second coupling of the compound (III) with 1-R-3-R"-4-methyl-6-hydroxy-2-pyridone, compounds with Formula I are obtained.

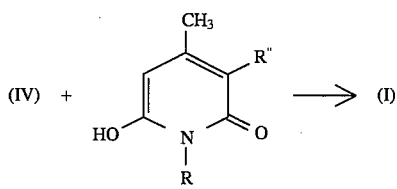

wherein R represents H, $C_nH_{2n+1}$ wherein n is a natural number between 1 and 4, or $(CH_2)_mOR'$ wherein m is a natural number between 1 and 4 and R' represents $C_pH_{2p+1}$ wherein p is an integral number between 0 and 4; wherein R" represents H, CN or COOR wherein R has the same definition as above. The sulfo group may be at any position of the benzene ring.

According to the embodiments of this invention, aminobezenesulfonic acids suited in this invention include: metanilic acid, orthanilic acid or sulfanilic acid. The 1-substituted pyridones (i.e., R) used in the coupler include: 1-methyl, 1-ethyl, 1-propyl, 1-(2'-hydroxyethyl), and 1-(3'-methoxypropyl). R" may be —H, —CN or —COOR wherein R represents H, $C_nH_{2n+1}$ wherein n is a natural number between 1 and 4, or $(CH_2)_mOR'$ wherein m is a natural number between 1 and 4 and R' represents $C_pH_{2p+1}$ wherein p is an integral number between 0 and 4.

The following examples serve to further illustrate the present invention.

EXAMPLE 1

A. Diazotization of Metanlic Acid

To the mixture of 9.0 g (0.052 mole) metanilic acid, 14 g (0.13 mole) HCl (34%), 50 ml water and 150 g ice at 0–5'C. was added in portions 3.8 g (0.055 mole) $NANO_2$. Stir the mixture at 0–5'C. for one hour. The excess amount of nitrous acid was decomposed with 0.4 g sulfamic acid.

B. First Coupling

Add 7.05 g of alpha-naphthylamine dissolved in 17.5 g glacial acid to the diazonium salt prepared in step A at 0–5'C. After ½ hour the pH value of the coupling mixture was adjusted to 3.5 by adding sodium hydroxide solution. The resulting mixture was further stirred at 5–15'C. for an additional period of ½ hour to complete the coupling.

C. Second Diazotization

To the first coupling mixture prepared in step B above was added 17.5 g (0.163 mole) HCl (34%) at 40–45'C. Then add during ½ hour 4.5 g (0.065 mole) $NaNo_2$ dissolved in 10 ml water. The resulting mixture was further stirred at 40–45'C. in the presence of excess amount of $HNO_2$. The mixture is then further stirred an additional period of one hour to complete the rediazotization. The diazonium salt having the following structure is collected by filtration:

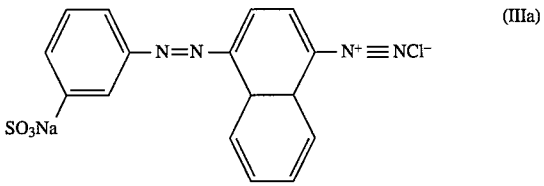

D. Second Coupling

Compound (IIIa) was stirred with 100 ml water into a smooth slurry to which 8.0 g (0.045 mole) 1-ethyl-3-cyano-6-hydroxy- 4-methyl-2-pyridone was then added. Adjust the temperature of the coupling mixture to 0'C. by adding ice. Adjust the pH value of the mixture to 6.0–7.0 by adding sodiium bicarbonate and maintain the pH value at 6.5 for 3–4 hours at the temperature not higher than 25° C. to complete the coupling (TLC does not show any yellow component).

E. Isolation of the Product

When the coupling was completed, adjust the pH value of the mixture obtained in step D with sodium hydroxide solution to 11.0–11.5 and the temperature to 60° C. Then adjust the pH to 8.0–8.5 with acetic acid. A product with the structure of formula (VIII) was collected by filtration.

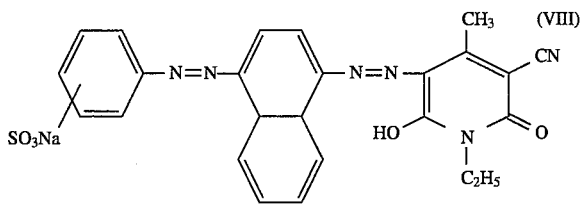

The compound so obtained is suited for neutral dyeing for polyamide fabrics, wool and silk and provides rubine shade with excellent fastness to light and washing.

EXAMPLES 2 AND 3

The procedures described in Example 1 were followed in which the step of adding 1-ethyl-3-cyano-6-hydroxy-4-methyl- 2-pyridone in the second coupling step is replaced by adding 0.045 mole of other selected pyridones to give the corresponding disazo dyes which are listed in table I:

TABLE I

EXAMPLE Selected Pyridone As Coupler Dye Obtained 1-(2'-hyrdoxyethyl)-3-cyano-  Formula IX
6-hydroxy-4-methyl-2-pyridone  R=CH$_2$CH$_2$OH
1-(3'-methoxypropyl)-3-cyano-  Formula IX
6-hydroxy-4-methyl-2-pyridone  R=CH$_2$CH$_2$CH$_2$OCH$_3$

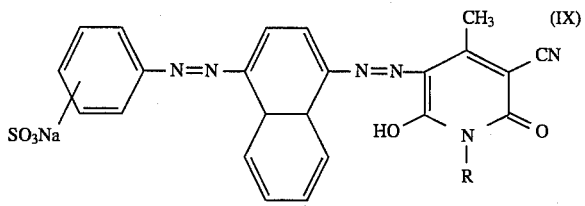

(IX)

The compounds so obtained are suited for neutral dyeing for polyamide fabrics, wool and silk and provides rubine shade with excellent fastness to light and washing.

EXAMPLE 4

The procedures described in Example 1 were followed but, instead of 9.0 g of metanilic acid, 9.0 g of sulfanilic acid was used in the first diazotization to give the product of the following formula.

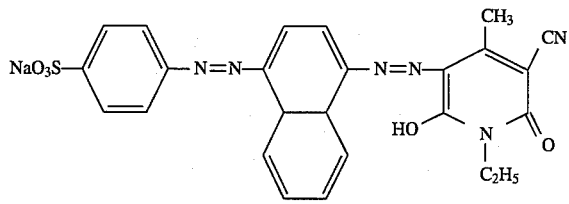

The compound so obtained is suited for neutral dyeing for polyamide fabrics, wool and silk and gives excellent rubine shade, with excellent fastness of light and washing.

As the present invention has been shown and described with reference to preferred embodiments thereof, those skilled in the art will recognize that the above and other changes may be made therein without departing from the spirit and scope of the invention.

We claim:

1. A compound having the following formula:

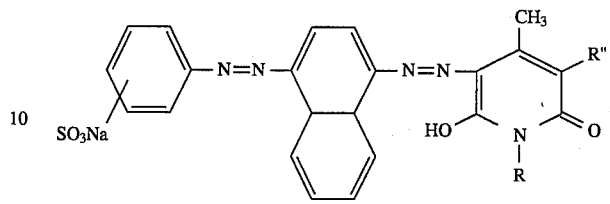

wherein R is CH$_2$CH$_2$OH and R" is hydrogen, and wherein the sulfo group may be at any position of the benzene ring.

2. A compound having the following formula:

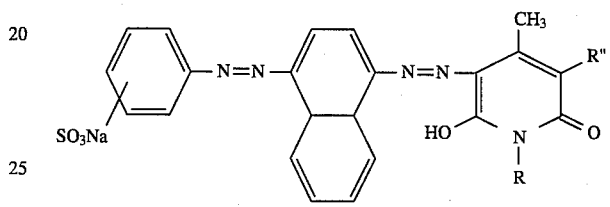

wherein R is CH$_2$CH$_2$CH$_2$OCH$_3$ and R" is hydrogen, and wherein the sulfo group may be at any position of the benzene ring.

3. A polyamide, wool or silk fabric neutral dyed with a composition having an effective amount of the compound of claim 1.

4. A polyamide, wool or silk fabric neutral dyed with a composition having an effective amount of the compound of claim 2.

5. A fabric containing polyamide, wool or silk fibers neutral dyed with a composition having an effective amount of the compound of claim 1.

6. A fabric containing polyamide, wool or silk fibers neutral dyed with a composition having an effective amount of the compound of claim 2.

* * * * *